United States Patent [19]
Kato et al.

[11] Patent Number: 6,079,722
[45] Date of Patent: Jun. 27, 2000

[54] FRONT SUSPENSION FOR VEHICLE

[75] Inventors: Yoichiro Kato, Bedfordshire, United Kingdom; Takeshi Suzuki, Tokyo, Japan

[73] Assignee: Nissan Motor Co., Ltd., Yokohama, Japan

[21] Appl. No.: 08/826,164

[22] Filed: Mar. 27, 1997

[30] Foreign Application Priority Data

Mar. 27, 1996 [JP] Japan .................................. 8-072627

[51] Int. Cl.[7] ........................................................ B60G 3/00
[52] U.S. Cl. .............................. 280/124.125; 280/124.1; 280/124.134; 280/124.146
[58] Field of Search ............................ 280/124.1, 124.11, 280/124.116, 124.117, 124.125, 124.13, 124.134, 124.135, 124.146, 124.152, 124.159, 124.157, 86.758, 87.752, 86.751, 86.75

[56] References Cited

U.S. PATENT DOCUMENTS 4,883,287  11/1989  Murakami et al. .
5,348,337   9/1994  Ando .
5,868,410   2/1999  Kawabe et al. .

*Primary Examiner*—Eric Culbreth
*Attorney, Agent, or Firm*—Foley & Lardner

[57] ABSTRACT

In the present invention a stabilizer bar is installed at a specific position. The installation position is set such that a joining member of a joint mechanism is rotatable around a second connector so as to draw an upper side of a wheel supporting member inward in the width direction of a vehicle when a downward force is input from the stabilizer bar to the installation position.

According to the invention, when a downward stabilizer reaction force is input from the stabilizer bar during a turn of the vehicle, the upper section of the wheel supporting member is relatively shifted inward in the vehicle width direction so that the camber angle of an outside wheel (in the turn) is changed into a negative direction. Thus, the outside wheel (in the turn) is moved towards its upright position under the effect of the stabilizer bar, thereby improving the turning characteristics of the vehicle.

15 Claims, 13 Drawing Sheets

OUTSIDE IN VEHICLE WIDTH DIRECTION

OUTSIDE IN VEHICLE WIDTH DIRECTION
→

REAR IN VEHICLE
FORE-AND-AFT DIRECTION
→

VEHICLE WIDTH DIRECTION

INSIDE IN VEHICLE WIDTH DIRECTION →

FRONT IN VEHICLE
FORE-AND-AFT DIRECTION

OUTSIDE IN VEHICLE WIDTH DIRECTION

FRONT IN VEHICLE
FORE-AND-AFT DIRECTION

FRONT IN VEHICLE
FORE-AND-AFT DIRECTION

FRONT IN VEHICLE
FORE-AND-AFT DIRECTION

FRONT IN VEHICLE
FORE-AND-AFT DIRECTION

FRONT SUSPENSION FOR VEHICLE

BACKGROUND OF THE INVENTION

1. Field of the Invention

This invention relates to improvements in a front suspension for a vehicle which suspension is of the type having both characteristics of a double wishbone type suspension and of a strut type suspension, and more particularly to a structure for installing a stabilizer bar to the front suspension of this type.

2. Description of the Prior Art

A vehicle front suspension of the type having both characteristic of a double wishbone type suspension and of a strut type suspension has been proposed by the same group including the inventors of the present invention and disclosed in a co-pending U.S. patent application Ser. No. 08/716,064, entitled "Front Suspension Device". This front suspension is arranged as follows: A rotational joint is disposed on the upper section of a steering knuckle for rotatably supporting a front wheel. The rotational joint includes a rotatable member which is rotatable around an imaginary axis of the rotational joint which axis extends generally vertical. A shock absorber is provided in such a manner that the lower section thereof is installed to the rotatable member of the rotational joint. An upper link is disposed to extend generally in a vehicle width direction, in which one end section thereof is connected to a vehicle body-side member while the other end section thereof is pivotally connected to the movable member of the rotational joint. A lower link is provided to extend in the vehicle width direction so as to connect the lower section of the steering knuckle and the vehicle body-side member. Additionally, the one end section of the upper link is connected at its single installation position to the vehicle body-side so as to form a connector, while the other end section of the upper link is connected at its single installation position to the movable member of the rotational joint so as to form a connector. Here, the upper link is arranged such that an imaginary axis connecting the centers of the both connectors crosses the axis of the rotational joint.

In general, a front suspension is provided with a stabilizer bar for the purpose of suppressing roll of a vehicle during turning of the vehicle. The stabilizer bar extends in the vehicle width direction and is supported at its central section to a vehicle body-side member such as a suspension member. Each of the opposite end sections or wheel-side installation sections of the stabilizer bar is connected to a part of the front suspension. For example, in a front suspension of the strut type or the double wishbone type, each wheel-side installation section is connected to a lower link or the like of the suspension.

However, the above-discussed front suspension has been newly developed and proposed, and therefore a suitable arrangement for installing the stabilizer bar to the front suspension has not yet been disclosed. Assume that the wheel-side installation section of the stabilizer bar is connected to the lower link of the front suspension similarly to in conventional front suspensions. In this case, if a stabilizer reaction force in a vertical direction is input to the lower link during turning of the vehicle, the camber angle of the front wheel cannot be changed under the action of the stabilizer reaction force. In other words, the stabilizer bar provides no effect to a camber angle change in the front wheel during the turning of the vehicle.

Otherwise, in case that the wheel-side installation section of the stabilizer bar is connected to the inside section of the steering knuckle, it can be made possible that the camber angle of the outside wheel in a vehicle turn is slightly changed into a negative direction by an amount corresponding to the yield of an elastomeric bushing disposed at the installation section of suspension links. In view of this, it may be proposed to lower the rigidity of the elastomeric bushing. However, if the rigidity of the elastomeric bushing is set to be low in the conventional suspensions, difficulties are encountered in the suspension such that, for example, the wheel alignment stiffness cannot be maintained at a suitable level. For such reasons, it has been difficult to optimize both the rigidity of the elastomeric bushing and the camber angle change during the vehicle turn. In other words, lowering the rigidity of the elastomeric bushing will reduce the amount of the camber angle change in a negative direction under the action of the stabilizer reaction force.

SUMMARY OF THE INVENTION

It is an object of the present invention to provide an improved front suspension which can effectively overcome the drawbacks encountered in conventional front suspensions provided with a stabilizer bar.

Another object of the present invention is to provide an improved front suspension which can improve the turning characteristics of a vehicle equipped with the front suspension under the action of a stabilizer reaction force, without affecting a wheel alignment stiffness.

A further object of the present invention is to provide an improved front suspension by which, during turning of a vehicle equipped with the suspension, an outside wheel in the turning tends to be brought into its upright position when a stabilizer reaction force is applied from a stabilizer bar to the front suspension.

A first aspect of the present invention resides in a front suspension for a vehicle, having a wheel supporting member for rotatably supporting a front wheel of the vehicle. A lower link has a first end section rotatably connected to a lower section of the wheel supporting member, and a second end section pivotally connected to a vehicle body-side member. A joint mechanism is disposed at an upper section of the wheel supporting member. The joint mechanism includes a joining member which is rotatable around an imaginary axis of the joint mechanism which axis extends generally vertical. A shock absorber has an upper end section connected pivotally to the vehicle body-side member, and a lower section connected to the joining member of the joint mechanism. An upper link has a first end section connected pivotally to the vehicle body-side member, and a second end section connected pivotally to the joining member of the joint mechanism. The first end section of the upper link includes a single first connecting member forming part of a first connector through which the upper link first end section is connected to the vehicle body-side member. The second end section of the upper link includes a single second connecting member forming part of a second connector through which the upper link second end section is connected to the joining member of the joint mechanism. The first and second connectors have respectively first and second centers which are connected by an imaginary upper link axis which crosses the axis of the joint mechanism in plan or on an imaginary horizontal plane containing a longitudinal axis of the vehicle. A tie rod is provided to be movable in a width direction of the vehicle with steering so as to rotationally move the wheel supporting member. A stabilizer bar has a wheel-side installation section which is connected at an installation position to the joining member of the joint mechanism. The installation position is set such that the joining member is rotatable around the second connector so as to draw an upper side of the wheel supporting member inward in the width direction of the vehicle when a downward force is input from the stabilizer bar to the installation position.

A second aspect of the present invention resides in a front suspension for a vehicle, comprising a wheel supporting member for rotatably supporting a front wheel of the vehicle. A lower link has a first end section rotatably connected to a lower section of the wheel supporting member, and a second end section pivotally connected to a vehicle body-side member. A joint mechanism is disposed at an upper section of the wheel supporting member. The joint mechanism includes a joining member which is rotatable around an imaginary axis of the joint mechanism which axis extends generally vertical. A shock absorber has an upper end section connected pivotally to the vehicle body-side member, and a lower section connected to the joining member of the joint mechanism. An upper link has a first end section connected pivotally to the vehicle body-side member, and a second end section connected pivotally to the joining member of the joint mechanism. The first end section of the upper link includes a single first connecting member forming part of a first connector through which the upper link first end section is connected to the vehicle body-side member. The second end section of the upper link includes a single second connecting member forming part of a second connector through which the upper link second end section is connected to the joining member of the joint mechanism. The first and second connectors have respectively first and second centers which are connected by an imaginary upper link axis which crosses the axis of the joint mechanism on an imaginary horizontal plane containing a longitudinal axis of the vehicle. A tie rod is provided to be movable in a width direction of the vehicle with steering so as to rotationally move the wheel supporting member. A stabilizer bar having a wheel-side installation section which is connected at an installation position to the joining member of the joint mechanism. The installation position is set such that the joint member is rotatable around the second connector so as to draw an upper side of the wheel supporting member inward in the width direction of the vehicle when a downward force is input from the stabilizer bar to the installation position. The installation position is fixed relative to the joining member and located outside a region between the axis of the joint mechanism and the upper link axis in plan or on the horizontal plane.

According to the front suspension of the present invention, when a downward stabilizer reaction force is input from a stabilizer bar during a turn of the vehicle, the upper section of the wheel supporting member is relatively shifted inward in the vehicle width direction so that the camber angle of the outside wheel (in the turn) is changed into a negative direction. Thus, the outside wheel (in the turn) is moved toward its upright position under the effect of the stabilizer bar thereby improving the turning characteristics of the vehicle.

Additionally, the front suspension of the present invention can maintain a sufficient wheel alignment stiffness such as a camber stiffness while exhibiting the advantageous effects of both a double wishbone type suspension and a strut type suspension.

DETAILED DESCRIPTION OF THE INVENTION

Figure 1:
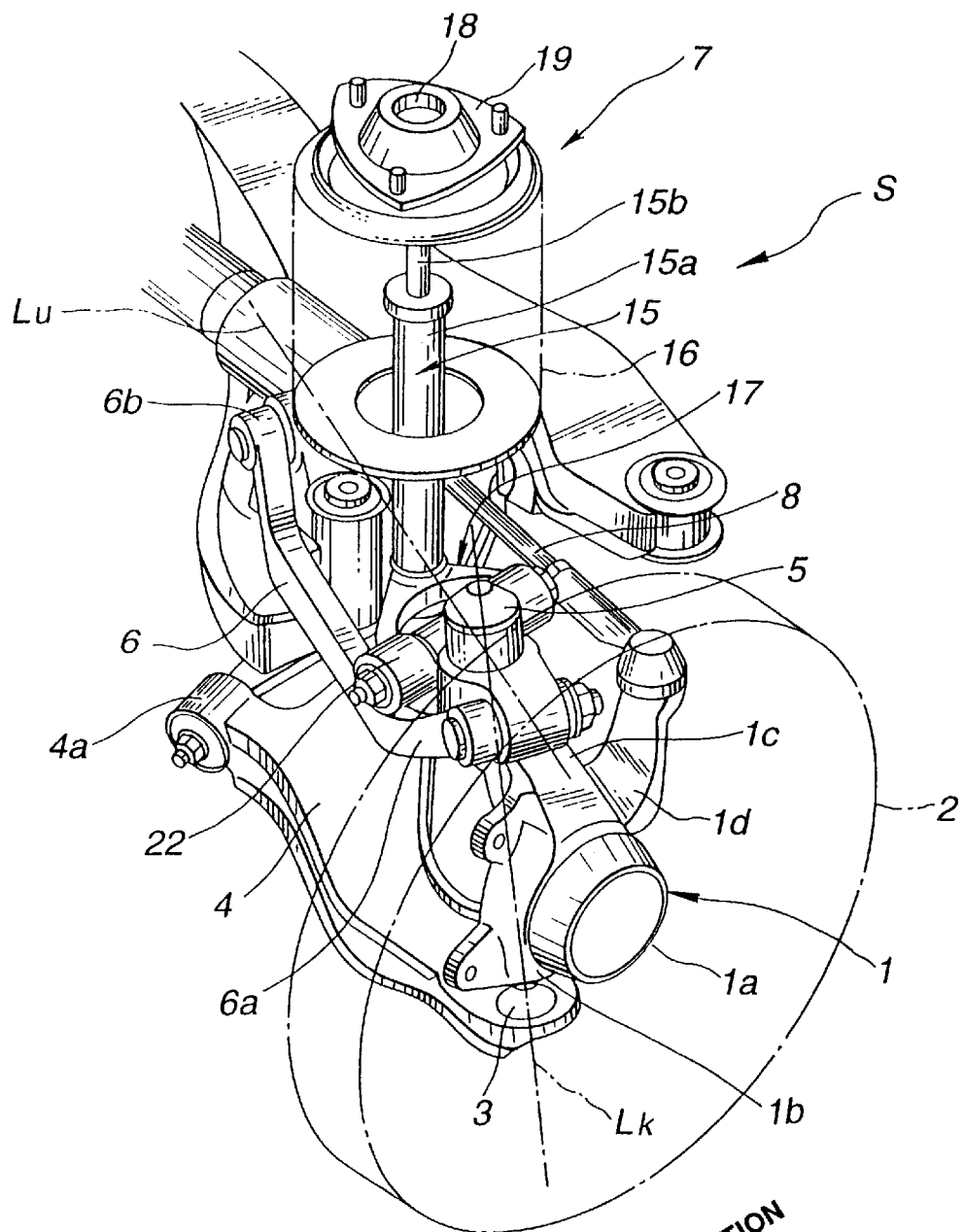
FIG. 1 is a fragmentary perspective view of a first embodiment of a front suspension according to the present invention.

Referring now to FIGS. 1 to 10, a first embodiment of a front suspension according to the present invention is illustrated by the reference character S. The suspension S is of an automotive vehicle (not shown) and comprises a steering knuckle or wheel supporting member 1 on which a front (road) wheel 2 is rotatably supported. The steering knuckle 1 is integrally formed at its central part with a cylindrical section 1a through which a front axle or drive shaft 13 is passed to be rotatably supported. A lower link 4 is disposed below the drive shaft 13 and has an outboard-side end section (no numeral) which is connected through a ball joint 3 to a lower end section 1b of the steering knuckle 1. An upper link 6 is disposed above the drive shaft 13 and has an outboard-side end section 6a which is connected through a rotational joint or joint mechanism 5 to an upper section 1c of the steering knuckle 1. A strut 7 is disposed above the drive shaft 13 and connected through the rotational joint 5 to the upper section 1c of the steering knuckle 1. A tie rod 8 is connected to a support section 1d which projects from the rear side of a central part of the steering knuckle 1.

The lower link 4 is disposed to extend generally in a width direction of the vehicle. The lower link 4 is bifurcated at its inboard-side to form two end sections 4a, 4a each of which is connected through an elastomeric bushing (not shown) to a vehicle body-side member such as a suspension member, so that the lower link 4 is formed generally A-shaped in plan. Accordingly, this lower link 4 functions to allow the steering knuckle 1 to vertically move, i.e., allow bound and rebound of the wheel 2, and to prevent the steering knuckle 1 from moving in a fore-and-aft direction of the vehicle.

Figure 2:
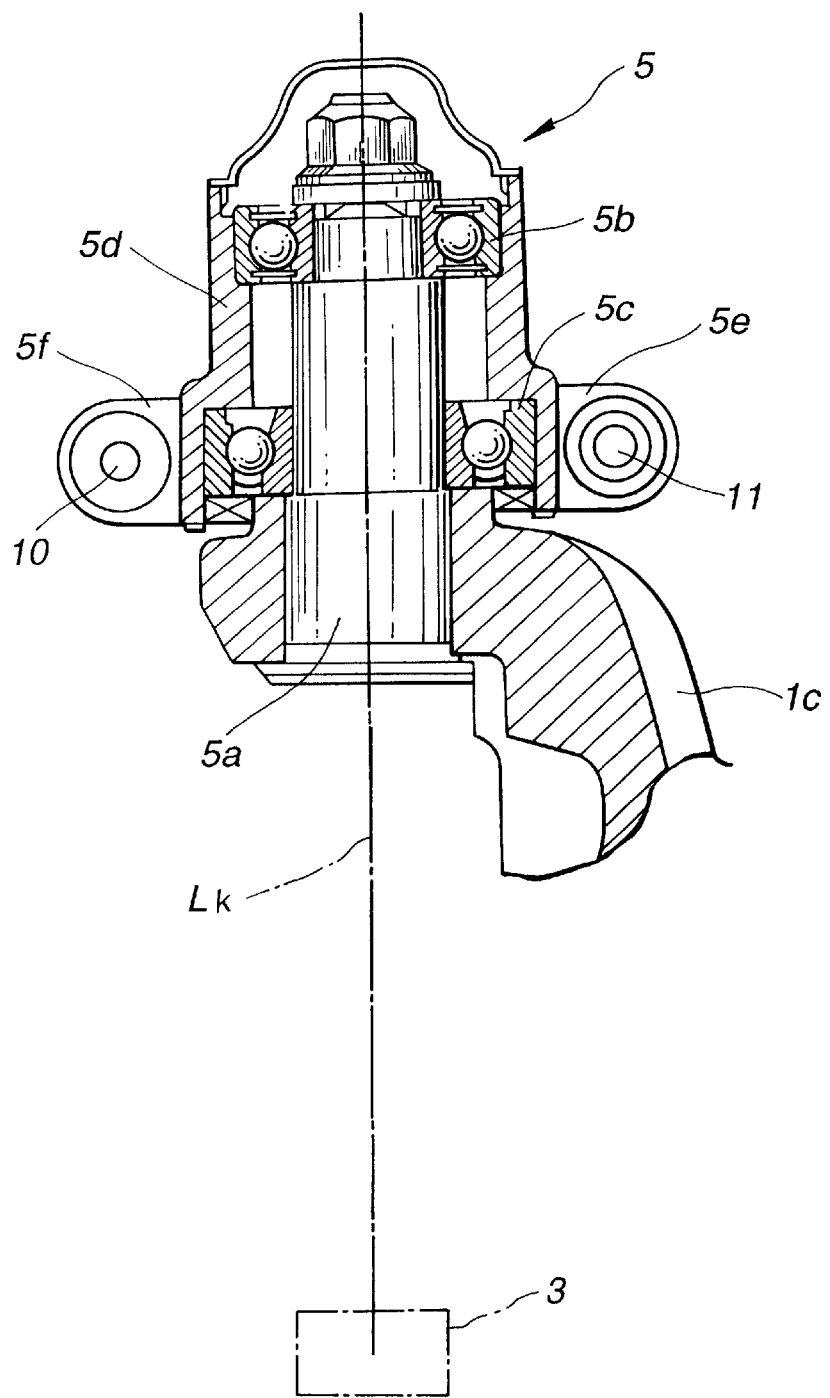
FIG. 2 is a fragmentary enlarged sectional view of a rotational joint of the front suspension of FIG. 1.

As shown in FIG. 2, the rotational joint 5 includes a support shaft 5a which is formed including three parts (no numerals) which are coaxial with and different in diameter from each other. The support shaft 5a has an axis which is aligned with a king pin axis (steering axis) $L_K$ passing through the center of the ball joint 3. The support shaft 5a is fixed at its lower part to the upper section 1c of the steering knuckle 1. A cylindrical member 5d is spacedly disposed around the support shaft 5a and rotatably supported on the support shaft 5a through bearings 5b, 5c. The cylindrical member 5d is provided with first and second cylindrical support sections 5e, 5f which are formed respectively at the outboard-side and the inboard-side in the width direction of the vehicle.

In this embodiment, the rotational joint 5 is disposed at the inboard-side relative to the center of the ball joint 3 in the width direction of the vehicle, and therefore the rotation axis of the rotational joint 5 or the king pin axis $L_K$ inclines inward in the width direction of the vehicle as a position on the king pin axis $L_K$ displaces upward as shown in FIG. 2. Additionally, the king pin axis $L_K$ inclines rearward in the fore-and-aft direction of the vehicle as a position on the king pin axis $L_K$ displaces upward thereby to have a predetermined caster angle.

Figure 3:
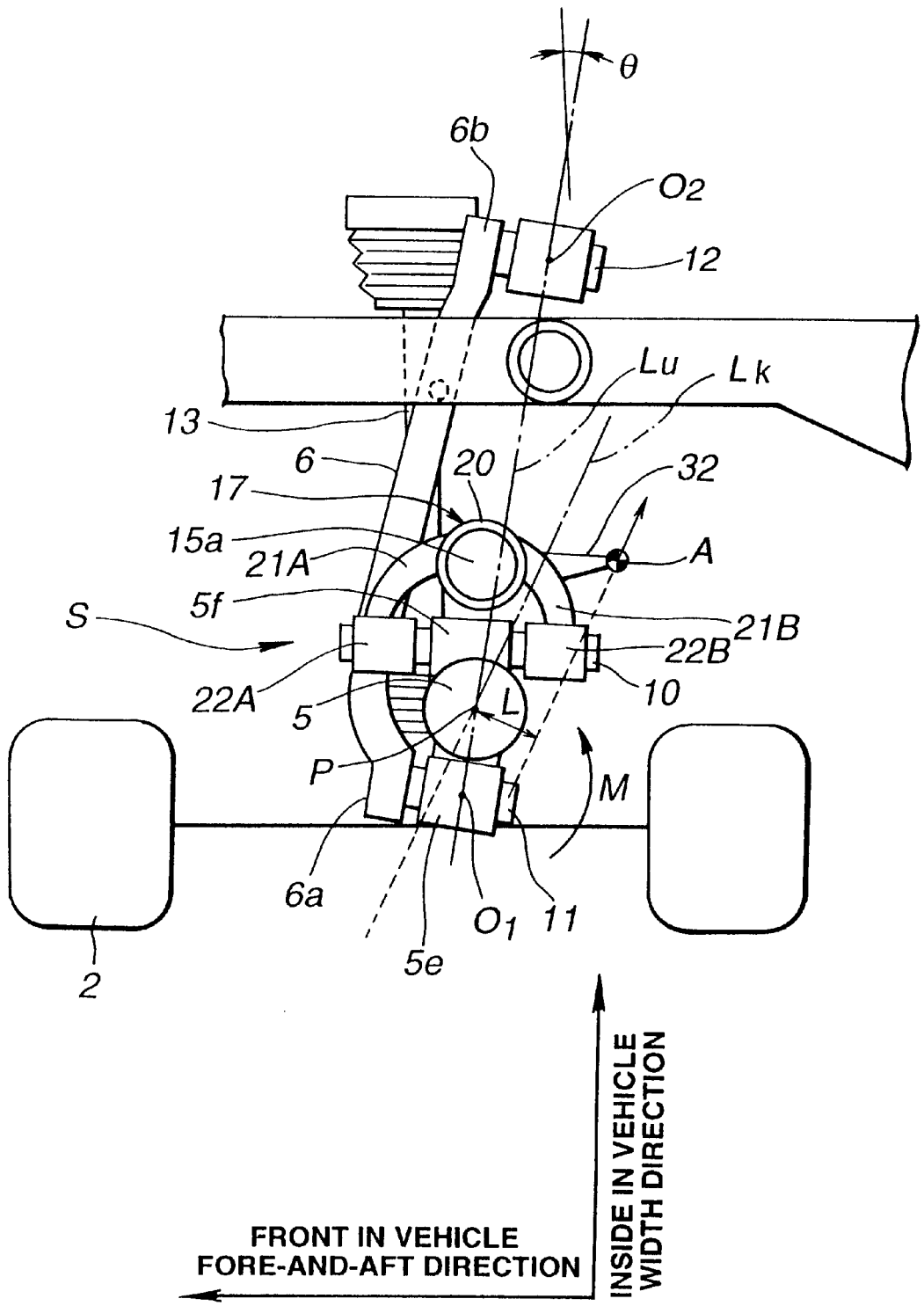
FIG. 3 is a fragmentary schematic plan view of the front suspension of FIG. 1.
Figure 4:
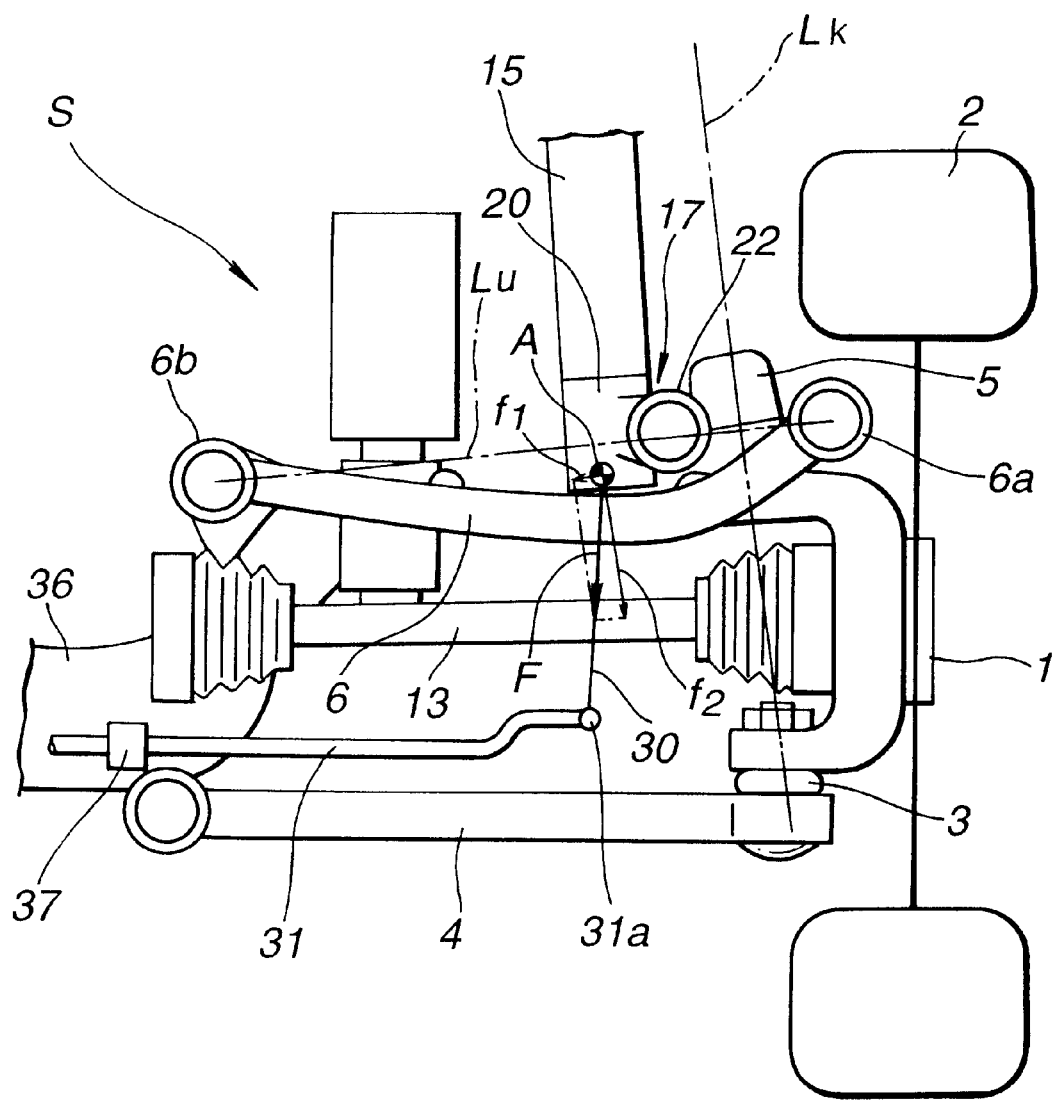
FIG. 4 is a fragmentary schematic front view of the front suspension of FIG. 1.

As shown in FIGS. 3 and 4, the first cylindrical support section 5e is adapted to support the outboard-side end section 6a of the upper link 6 and located in such a manner that the axis of the first cylindrical support section 5e is perpendicular to an axis Lu (discussed after) of the upper link 6 and located generally horizontal. An elastomeric bushing (not shown) is coaxially disposed inside the first cylindrical support section 5e. The second cylindrical support section 5f is located generally horizontal and extends in the fore-and-aft direction of the vehicle. An installation bolt 10 as a rotatable support shaft is disposed through the second cylindrical support section 5f.

The upper link 6 is constituted of a single generally I-type link and provided at its outboard-side end section 6a with a rotatable shaft or connecting member 11 which is inserted in the elastomeric bushing inside the first cylindrical support member 5e. A cylindrical collar (not shown) is disposed between the rotatable shaft 11 and the elastomeric bushing. Additionally, a rotatable shaft or connecting member 12 is provided at the inboard-side end section 6b (in the width direction of the vehicle) of the upper link 6, in which the rotatable shaft 12 is provided with an elastomeric bushing (not shown) disposed in the vehicle body-side member.

In this embodiment, the upper link 6 extends generally in the width direction of the vehicle in such a manner that the outboard-side end section 6a is located forward relative to the inboard-side end section 6b in the fore-and-aft direction of the vehicle as seen in FIG. 3. Additionally, the upper link 6 is disposed in front of the rotational joint 5 in the fore-and-aft direction of the vehicle and extends passing by the rotational joint 5. Thus, the upper link 6 is arranged such that the axis or straight line Lu connecting the axial centers $O_1$, $O_2$ of the elastomeric bushings of the end sections 6a, 6b inclines at an angle θ relative to a straight line extending in the width direction of the vehicle in plan as shown in FIG. 3, in such a manner that the axis Lu of the upper link 6 is located forward (in the fore-and-aft direction) at the outboard-side (in the width direction of the vehicle) relative to at the inboard-side. The above axial center $O_1$, $O_2$ resides on the axis of each elastomeric bushing. Additionally, the axis Lu of the upper link 6 crosses the king pin axis $L_K$ (the axis of the rotational link 5) at a point P in plan or on an imaginary horizontal plane containing a longitudinal axis (not shown) of the vehicle as shown in FIG. 3 and also on an imaginary vertical plane to which the longitudinal axis of the vehicle is perpendicular or as viewed from the front side of the vehicle as shown in FIG. 4. The outboard-side end section 6a of the upper link 6 is located inside the wheel 2.

The strut 7 includes a shock absorber 15 having a cylinder tube 15a. A spring 16 is disposed around the shock absorber 15. A support bracket 17 is installed to the bottom section of the cylinder tube 15a and connected to the second cylindrical support section 5f so as to be rotatable only generally in the width direction of the vehicle. A piston rod 15b movably projects from the top end section of the cylinder tube 15a, and has an upper end section which is pivotally secured to the vehicle body-side member through a mount rubber 18 and an installation plate 19.

The support bracket 17 includes a cylindrical installation section 20 to which the bottom end section of the cylinder tube 15 is securely mounted. Front and rear arms 21A, 21B are provided curved to connect the cylindrical installation section 20 and the cylindrical member 5d of the rotational joint 5. Specifically, the front arm 21A has a first end integrally connected to the front side of the cylindrical installation section 20, and a second end integrally provided with a front-side third cylindrical support section 22A. The rear arm 21B has a first end integrally connected to the rear side of the cylindrical installation section 20, and a second end integrally provided with a rear-side third cylindrical support section 22B. An elastomeric bushing (not shown) is disposed inside each of the third cylindrical support sections 22A, 22B. The front-side and rear-side third cylindrical support sections 22A, 22B are disposed coaxial with each other and have an axis which extends generally in the fore-and-aft direction of the vehicle. The support bracket 17 and the cylindrical member 5d of the rotational joint 5 constitute a joining member.

The support bracket 17 is assembled with the rotational joint 5 as follows: The cylindrical installation section 20 is installed to the bottom end section of the cylinder tube 15a. The front-side and rear-side third cylindrical support sections 22A, 22B of the arms 21A, 21B are located at the front and rear sides of the second cylindrical support section 5f. Then, the installation bolt 10 is inserted into the central openings of the elastomeric bushings in the third cylindrical support sections 22A, 22B and into the central opening of the elastomeric bushing in the second cylindrical support section 5f of the rotational joint 5 under a state where the axes of the central openings of the above three elastomeric bushings are aligned. Finally, nuts (no numerals) are screwed on the opposite end sections of the installation bolt 10.

As shown in FIGS. 4 to 7, a stabilizer bar 31 is provided below the drive shaft 13 and the strut 7. The stabilizer bar 31 has a wheel-side installation section 31a which is connected through a connecting rod 30 with the cylindrical installation section 20 of the support bracket 17. A point A in FIGS. 3 and 4 indicates the center of a joint J (See FIG. 5) at which the connecting rod 30 is joined to the cylindrical installation section 20 of the support bracket 17. The point A is referred to also as an installation point of the stabilizer bar 31.

Figure 5:
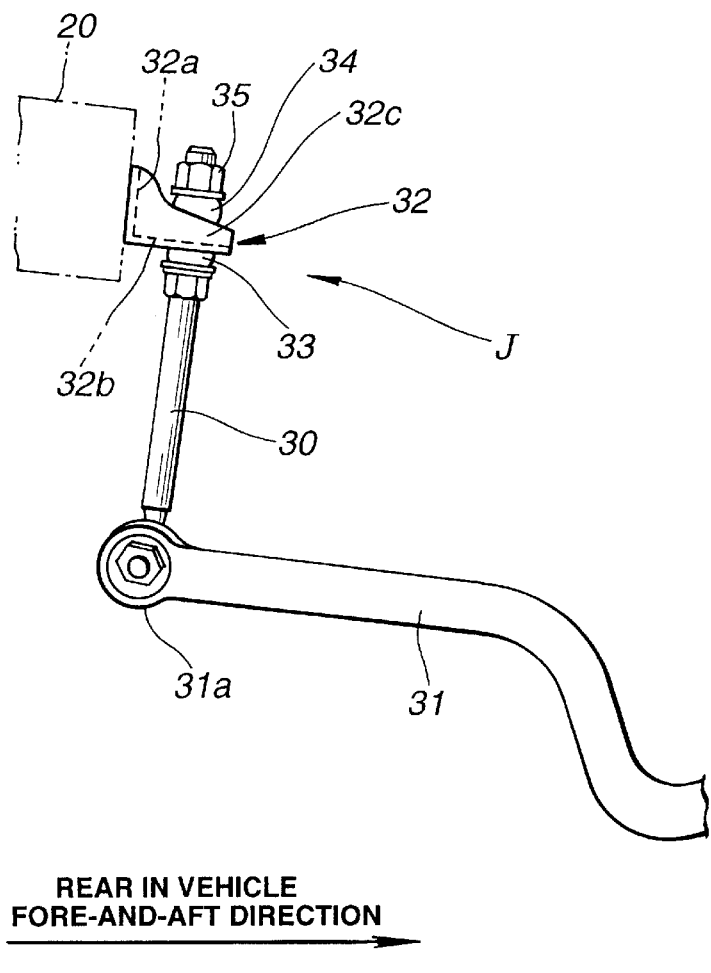
FIG. 5 is a fragmentary enlarged side view of an installation structure for a stabilizer bar of the front suspension of FIG. 1.
Figure 6:
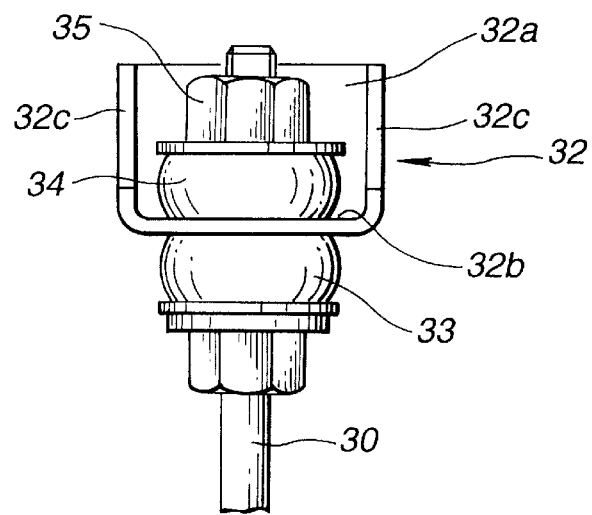
FIG. 6 is a fragmentary enlarged rear view of an essential part of the installation structure of FIG. 5.

The joint J for the stabilizer bar 31 is arranged as follows: As shown in Fig., 5, a connecting rod installation bracket 32 is fixedly installed to a side surface of the cylindrical installation section 20 which side surface is located at the rear side in the fore-and-aft direction of the vehicle. The installation bracket 32 is formed projecting rearward in the fore-and-aft direction of the vehicle. As shown in FIGS. 5 and 6, the installation bracket 32 includes a vertical wall section 32a which is fixed and in contact with the cylindrical installation section 20. A horizontal wall section 32b is integral with and extends from the vertical wall section 32a so as to project rearward in the fore-and-aft direction of the vehicle, in which the connecting rod 30 is supported to the horizontal wall section 32b. A pair of reinforcement wall sections 32c are provided at the opposite ends of the horizontal wall section 32a so as to integrally connect the vertical wall section 20 and the horizontal wall section 32b.

A pair of rubbers 33, 34 are disposed at the opposite sides of the horizontal wall section 32b in such a manner that they are respectively in contact with the upper and lower surfaces of the horizontal wall section 32b. A through-hole or installation hole is formed throughout the rubbers 33, 34 and the horizontal wall section 32b. An upper end section of the connecting rod 30 is inserted into the through-hole from the under-side to take a state where a tip end part of the connecting rod upper end section projects from the upper rubber 33. A nut 35 is screwed on the tip end part of the connecting rod upper end section. As a result, the upper end section of the connecting rod 30 is pivotally jointed through the connecting rod installation bracket 32 to the cylindrical installation section 20 of the support bracket 17.

Figure 11:
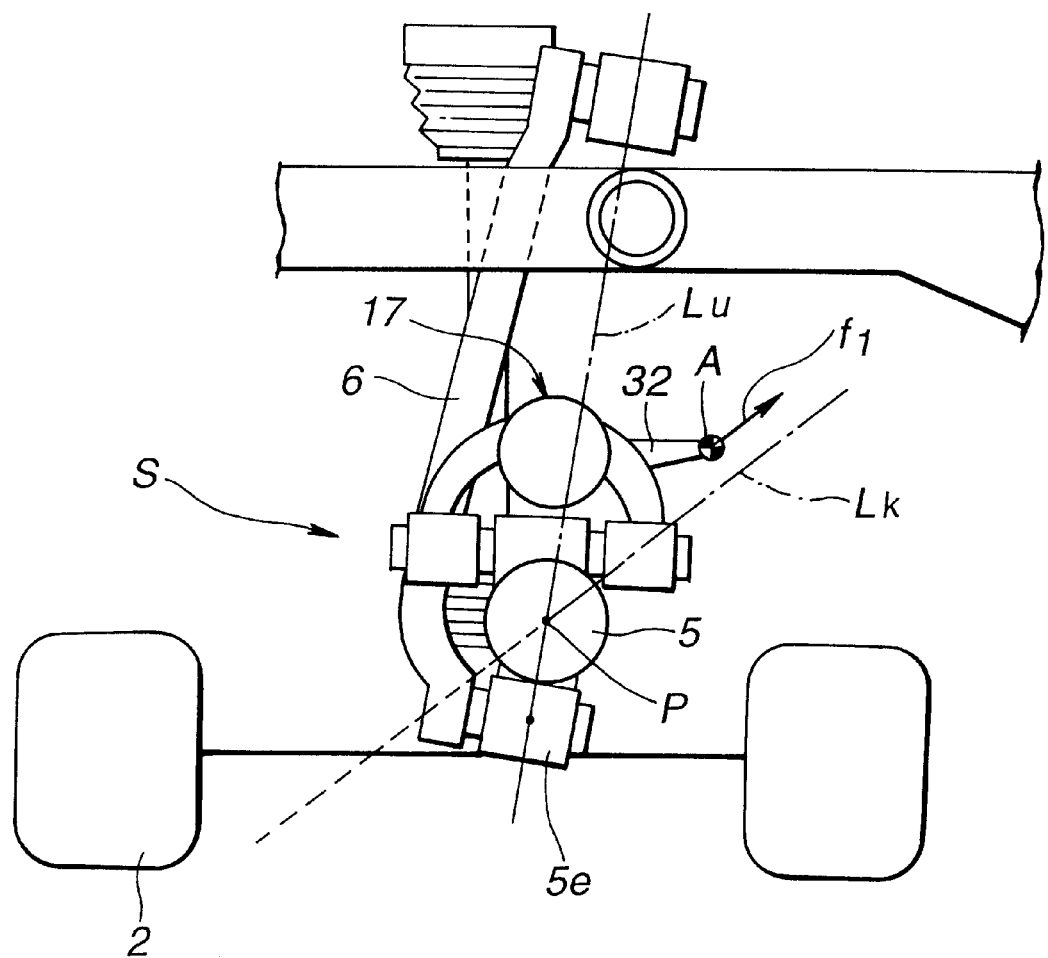
FIG. 11 is a fragmentary schematic plan view similar to FIG. 3.

Here, it will be understood that the axial center of the center axis of the installation hole of the horizontal wall section 32b of the connecting rod installation bracket 32 corresponds to the point A (the center of the joint J), in which the point A is located rearward of the king pin axis LK in the fore-and-aft direction of the vehicle, in plan or as viewed from the upper-side as shown in FIG. 3. Accordingly, it is preferable that a predetermined projection amount is set for the connecting rod installation bracket 32, in accordance with a caster angle set for the king pin axis $L_K$. In this connection, assuming that the projection amount of the connecting rod installation bracket 32 is small in case that the caster angle set for the king pin axis $L_K$ is large, the point A unavoidably comes into a position rearward of the king pin axis $L_K$ in the fore-and-aft direction of the vehicle, in plan or as viewed from the upper-side as shown in FIG. 11, which is not preferable for the present invention.

Figure 7:
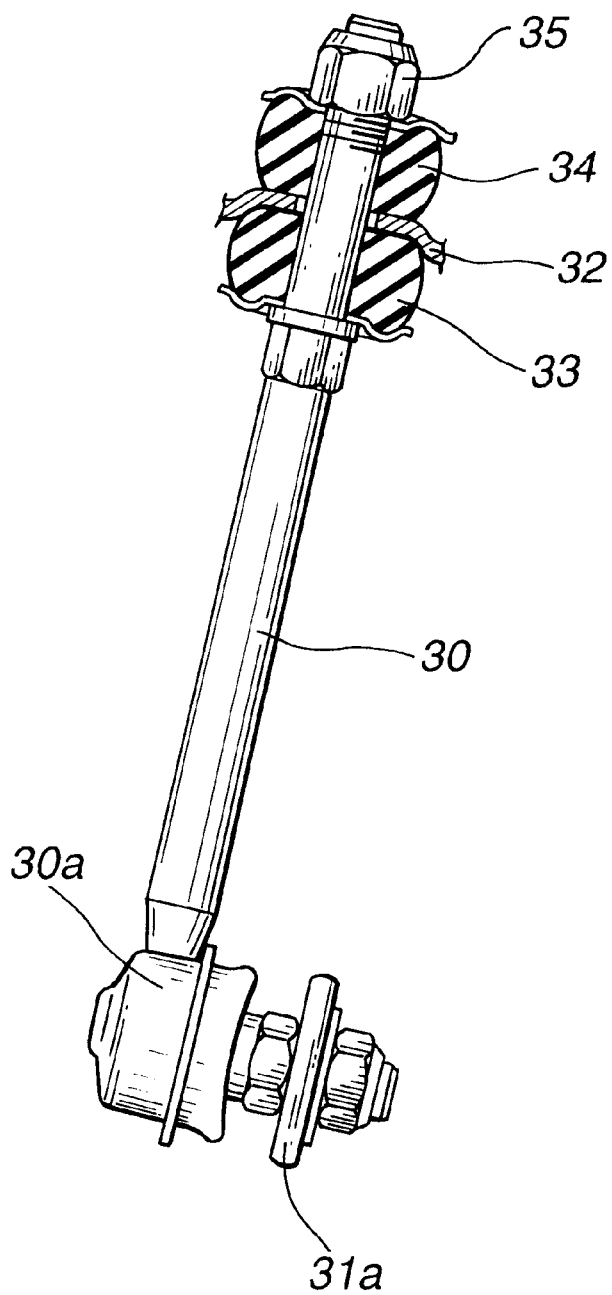
FIG. 7 is a fragmentary enlarged front view of an essential part of the installation structure of FIG. 5.
Figure 8:
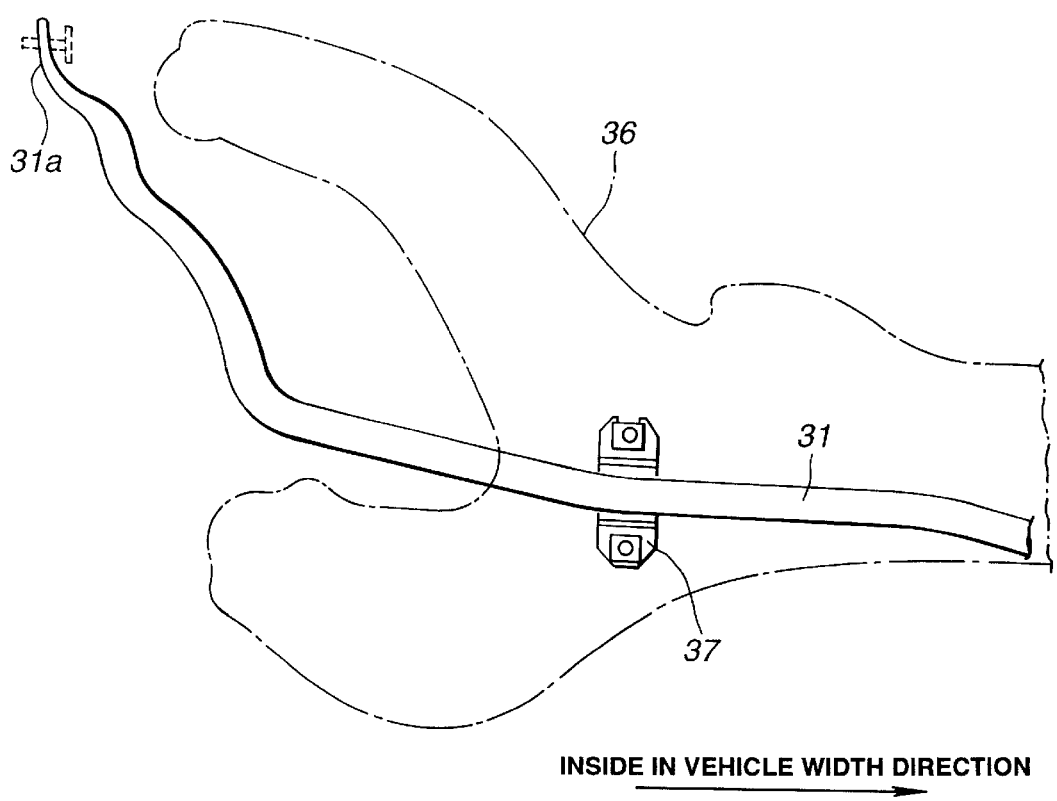
FIG. 8 is a fragmentary front view showing the stabilizer bar of the front suspension of FIG. 1.

As viewed in FIG. 7, the connecting rod 30 extends generally vertical and has a lower section 30a to which the wheel-side installation section 31a of the stabilizer bar 31 is connected. A pillow ball or the like (not shown) is disposed inside the lower end section 30a of the connecting rod 30 so as to allow the stabilizer 31 to rotationally move around the axis of the wheel-side installation section 31a. The connecting rod 30 is slightly inclined by a predetermined angle relative to a vertical plane (not shown) from the view point of layout in an engine compartment. The stabilizer bar 31 extends from the connecting rod lower end section 31a through the under-side of a suspension member 36 so as to extend generally in the width direction of the vehicle. The stabilizer bar 31 is disposed symmetrical with respect to a vertical plane (not shown) containing the longitudinal center axis (not shown) of the vehicle, so that a generally half part of the stabilizer bar 31 (shown in FIG. 8) is generally symmetrical with the other generally half part (not shown) of the stabilizer bar 32 with respect to the vertical plane containing the longitudinal center axis of the vehicle, in which the both generally half parts are integral with each other. The stabilizer bar 31 is supported to the suspension member 36 as the vehicle body-side member with installation stays 37 in a manner to be rotatable around its axis.

While fragmentary views for only an essential part of the suspension S around the left-side front (road) wheel have been shown in the drawings, it will be appreciated that the corresponding essential part around a right-side front (road) wheel is similarly arranged to the essential part around the left-side front wheel though not shown. The tie rod 8 connected at its outboard-side end section with the steering knuckle 1 is connected to a steering gear (not shown).

Next, a manner of operation of the front suspension S arranged above will be discussed.

The front suspension S is of the double wishbone type including the lower link 4 and the upper link 6 as viewed from the fore-and-aft direction of the vehicle while be of the strut type as viewed from the width direction of the vehicle. Accordingly, the front suspension S can exhibit advantages and overcome shortcomings of both the double wishbone type suspension and strut type suspension. More specifically, the movements of the front wheel 2 and the steering knuckle 1 with wheel stroke are restrained by the lower link 4 and the upper link 6, as viewed from the front side of the vehicle, thereby serving similar to the double wishbone type suspension, while the same movements are restrained by the lower link 4 and the shock absorber 15, as viewed from the width direction of the vehicle body, thereby serving similar to the strut type suspension.

Similar effects can be obtained in case of inputting force to the front wheels 2. In other words, force input to the front wheel 2 in the fore-and-aft direction of the vehicle is received by the lower link 4 and the strut 7 thereby serving like the strut type suspension, while force input in the lateral direction of the vehicle are received by the lower link 4 and the upper link 6 thereby serving like the double wishbone type suspension.

As discussed above, the axis Lu of the upper link 6 (connecting the axial centers $O_1$, $O_2$ of the elastomeric bushings of the end sections 6a, 6b) crosses the king pin axis $L_K$ at the point P in plan or as viewed from the upper-side, so that only compressive and tensile axial-forces act on the axis Lu of the upper link 6 assuming that slight forces due to torsion and twist loaded to the elastomeric bushings of the upper link is omitted. As a result, lowering in camber stiffness and lateral stiffness can be securely prevented from lowering even though the upper link 6 is of the I type and is connected at its one end with the rotational joint 5 or the vehicle body-side member through only one installation section or joint.

This can increase the freedom in layout from the view point of interference and the like between the front wheel and the installation section of the upper link particularly during turning of the vehicle while reducing the weight and production cost of the suspension. Furthermore, it is possible to construct a suspension for different types of vehicles merely by suitably selecting the spring constant of the spring 16 of the strut 7, the elastic modulus of the elastomeric bushings and the length of the lower link 4 and the upper link 6 as occasion demands.

When the same-directional bound and rebound strokes are made in the right-side and left-side front wheels in the vehicle provided with the front suspension S having the above effects, the stabilizer bar 31 does not twist so that no reaction force is input to the suspension S. When the vehicle turns and makes a roll toward the outside wheel in a turn, the outside wheel in the turn make bound while the inside wheel in the turn make rebound, thereby twisting the stabilizer bar 31. Under the effect of this twisting action of the stabilizer bar 31, downward force is generated at the wheel-side installation section 31a of the stabilizer bar 31 on the outside wheel in the turn, and therefore a stabilizer reaction force F is input to the point A (the center of the joint J) or to the connecting rod installation bracket 32 to which the wheel-side installation section 31a of the stabilizer bar 31 is connected through the connecting rod 30.

At this time, the above stabilizer reaction force F is directed generally in a vertical direction, in which the connecting rod installation bracket 32 and the cylindrical installation section 20 are rotatable only around the king pin axis $L_K$ (the axis of the rotational joint 5) which is inclined toward the inboard-side in the width direction of the vehicle as a position on the king pin axis $L_K$ displaces upward as shown in FIG. 4. As a result, the above stabilizer reaction force F is divided into a component force $f_1$ parallel with the king pin axis $L_K$ and another component force $f_2$ perpendicular to the king pin axis $L_K$. The component force $f_2$ is directed generally to the inboard-side in the width direction of the vehicle because of the above inclination of the king pin axis $L_K$. The component force $f_1$ parallel with the king pin axis $L_K$ is transmitted as it is through the rotational joint 5 to the steering knuckle 1. As shown in FIG. 3, the component force $f_2$ is offset rearward by a distance L relative to the king pin axis $L_K$ in the fore-and-aft direction of the vehicle in plan, and therefore the component force $f_2$ acts as a moment M around the king pin axis $L_K$, on the rotational joint 5.

Figure 9:
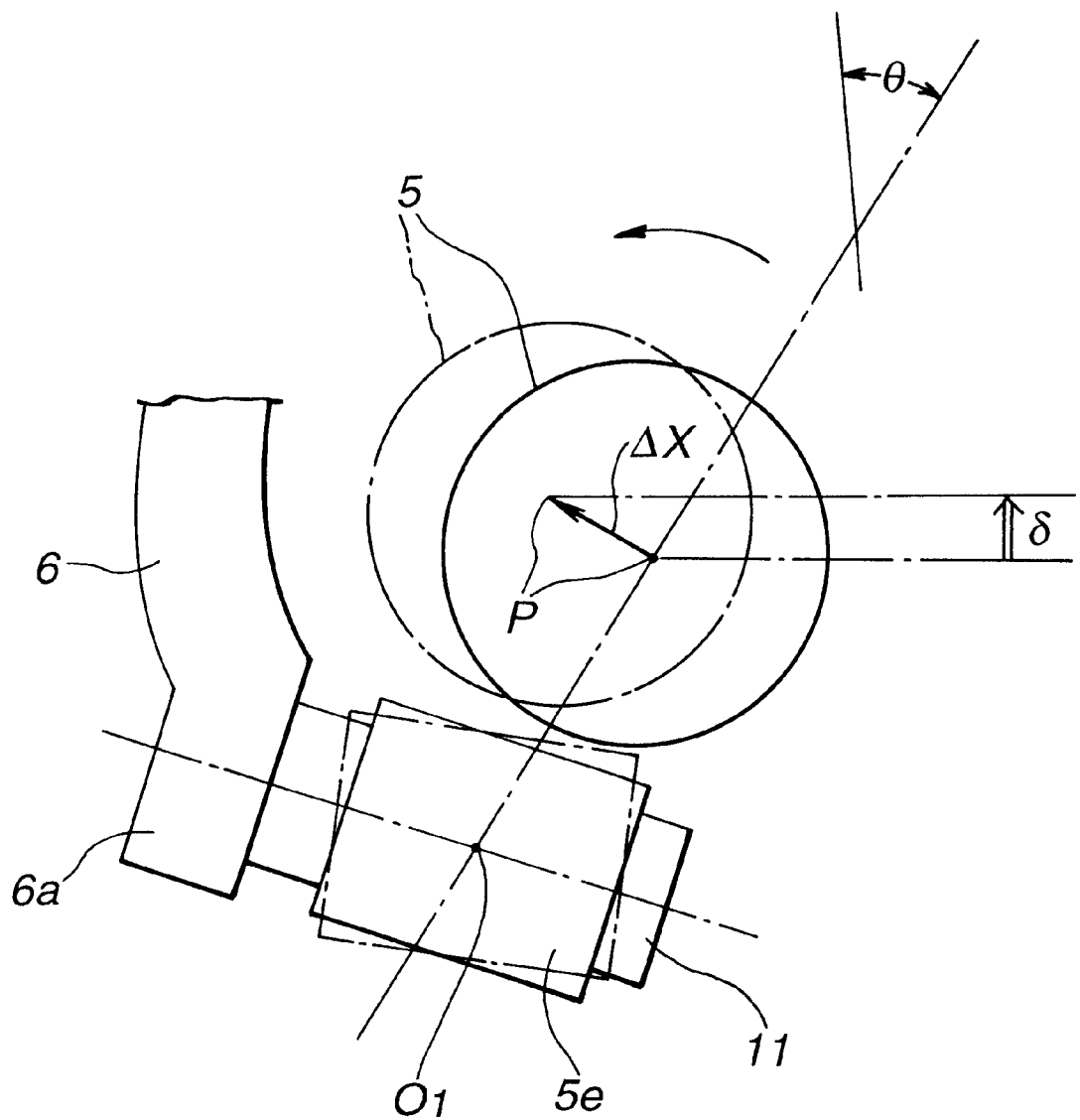
FIG. 9 is a fragmentary schematic plan view showing pivotal movement of the rotational joint of FIG. 2.
Figure 10:
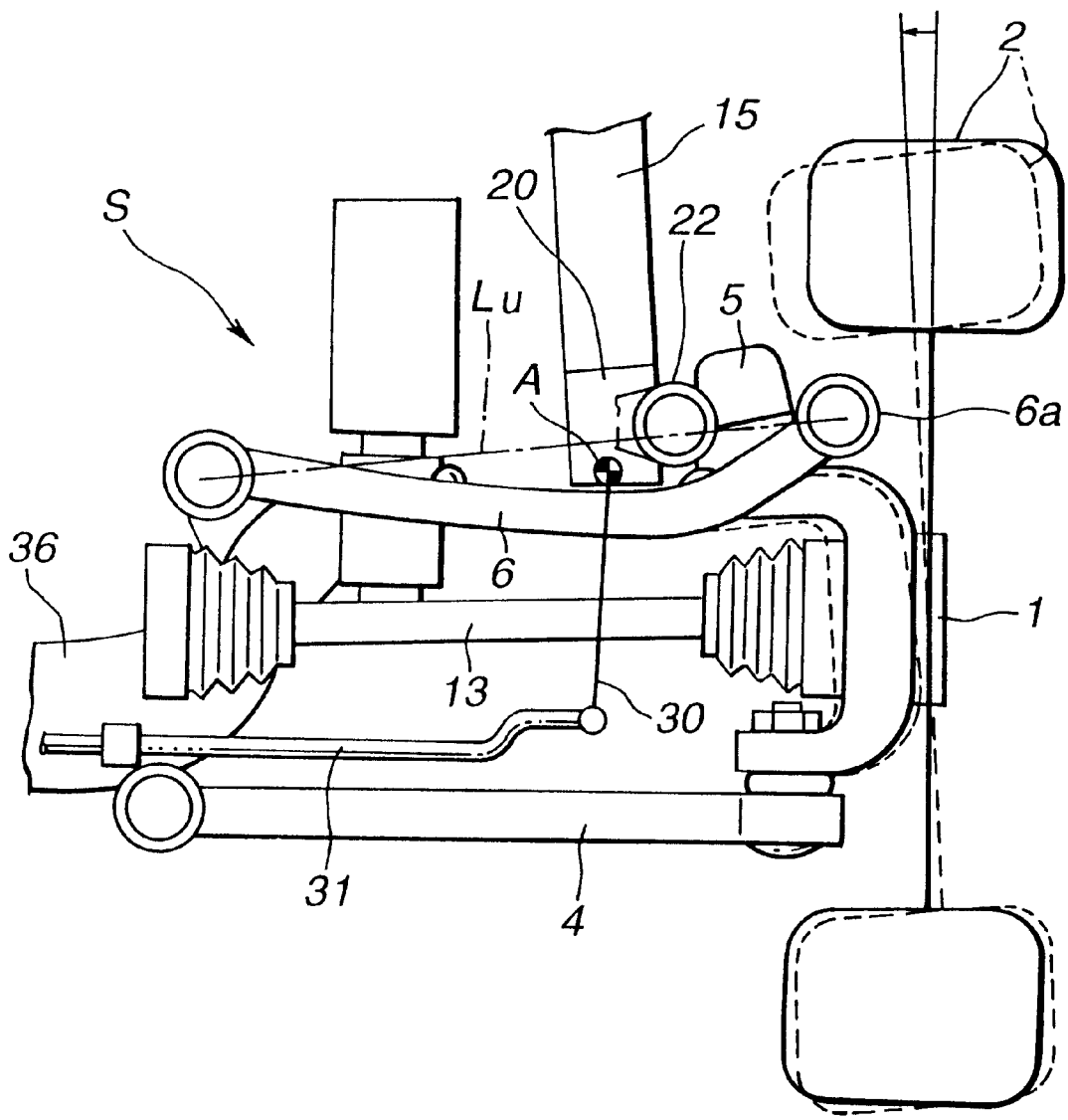
FIG. 10 is a fragmentary schematic plan view similar to FIG. 4 but showing a change in camber angle of a front wheel which is located outside in a turn of the vehicle.

Here, the shock absorber 15 whose lower end section is installed to the cylindrical installation section 20 hardly resists the above moment M since the upper end section of the shock absorber 15 is pivotally connected to the vehicle body-side member. Additionally, the above moment M cannot be transmitted to the steering knuckle 1 since the cylindrical member 5d of the rotational joint 5 is securely connected to the steering knuckle 1 in a state to be rotatable around the king pin axis LK. The rotational joint 5 is connected through the first cylindrical support section 5e to the outboard-side end section 6a of the upper link 6, and therefore, upon receiving the above moment M, the cylindrical member 5d of the rotational joint 5 rotationally moves around the installation point (axial center of the elastic bushing) $O_1$ of the outboard-side end section 6a of the upper link 6 so as to be displaced forward by a distance Δ x in the fore-and-aft direction of the vehicle as shown in FIG. 9. At this time, the rotational joint 5 makes its displacement of a distance δ in the width direction of the vehicle in addition to the above forward displacement in the fore-and-aft direction of the vehicle as shown in FIG. 9 since the axis Lu of the upper link 6 has the positive forward-inclination angle θ as shown in FIGS. 3 and 9.

Thus, the rotational joint 5 is drawn to the inboard-side in the width direction of the vehicle, and therefore a part of the king pin axis $L_K$ above the steering knuckle 1 is drawn to the inboard-side in the width direction of the vehicle without accompanying its rotational movement so that the camber angle of the outside front wheel in the turn is changed in a negative direction under the action of the stabilizer bar 31.

As a result, although the camber angle of the outside wheel in the turn is changed into the positive direction during turning of the vehicle, the camber angle in the negative direction is generated under the action of the stabilizer bar 31. Consequently, the outside wheel in the turn is brought into a tendency to become vertical or to have a zero chamber angle, so that the gripping force of a tire of the outside wheel to the ground is increased thereby improving a turning characteristics of the vehicle.

While the upper end section of the connecting rod 30 has been shown and described as being connected to the cylindrical installation section 20 of the support bracket 17 in the above embodiment, it will be understood that the upper end section of the connecting rod 30 may be connected to the rotational joint 5, the third cylindrical support section 22A, 22B, or the like, or directly connected to the lower end section of the shock absorber 15.

Figure 12:
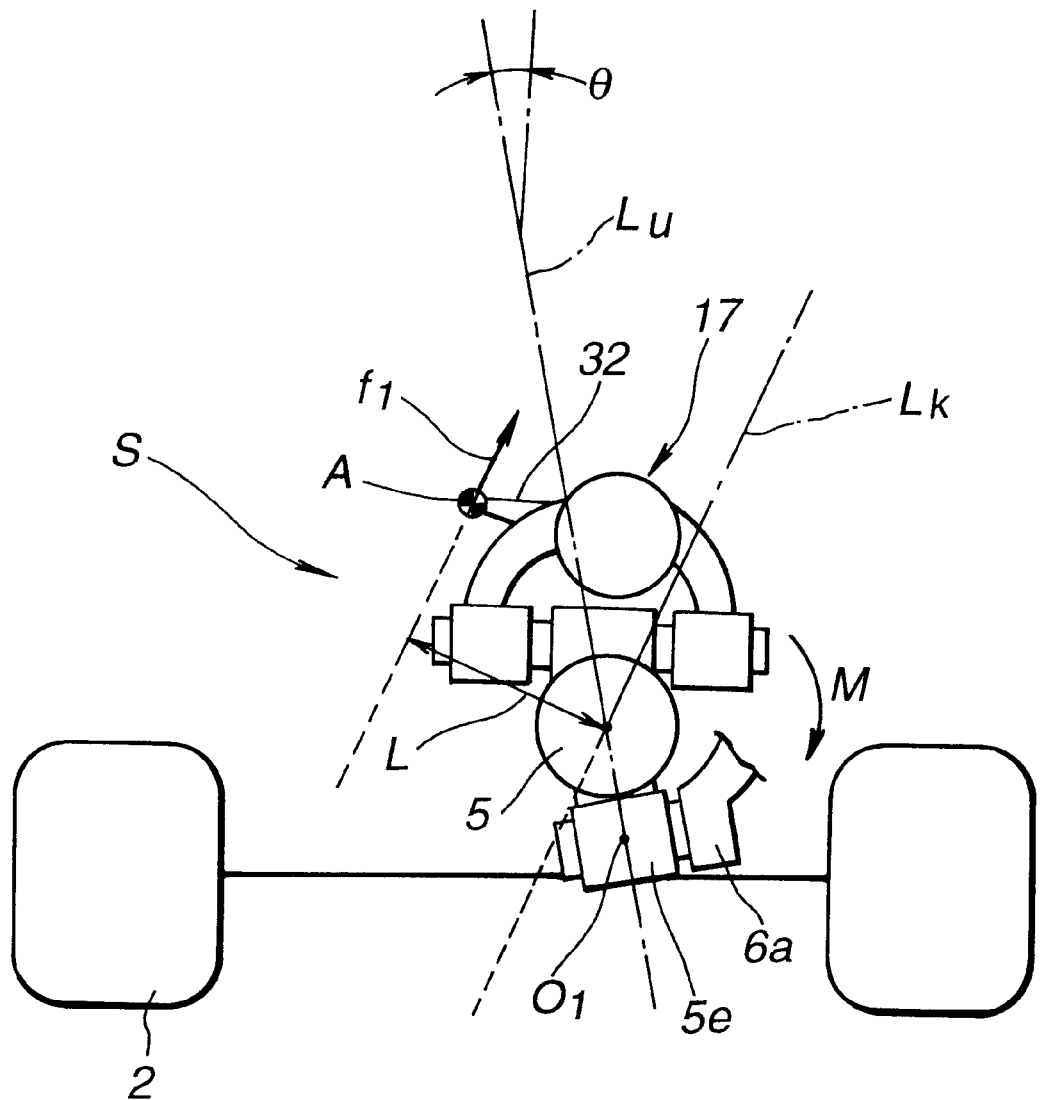
FIG. 12 is a fragmentary schematic plan view similar to FIG. 3 but showing a second embodiment of the front suspension according to the present invention.

FIG. 12 illustrates a second embodiment of the front suspension according to the present invention, which is similar in basic arrangement to the first embodiment front suspension as shown in FIGS. 1 to 10. In this embodiment, the axis Lu of the upper link 6 inclines in such a manner as to be located rearward (in the fore-and-aft direction of the vehicle) at the outboard-side (in the width direction of the vehicle) relative to at the inboard-side, in plan or as viewed from the upper-side. Additionally, the wheel side installation point A of the stabilizer bar 31 is set to be located forward relative to the king pin axis $L_K$ (the axis of the rotational joint 5) in the fore-and-aft direction of the vehicle, in plan or as viewed from the upper-side. The upper link 6 is disposed rearward of the rotational joint 5 in the fore-and-aft direction of the vehicle in order to avoid interference with the connecting rod 30. It will be appreciated that other arrangement of the front suspension of this embodiment is similar to that of the first embodiment.

In operation, when the vehicle is in a turn, the downward stabilizer reaction force F is input to the wheel side installation point A of the stabilizer bar 31 at the side of the outside wheel in the turn. At this time, similarly to in the first embodiment, the component force $f_2$ which is directed inward in the width direction of the vehicle and perpendicular to the king pin axis $L_K$ in plan is generated at the wheel side installation point A of the stabilizer bar 31. Here, the wheel side installation point A of the stabilizer bar 31 is offset forward relative to the king-pin axis $L_K$ in the fore-and-aft direction of the vehicle, dissimilarly to that in the first embodiment front suspension. As a result, when the above component force $f_2$ is generated, the moment M which is opposite in turning direction to that in the first embodiment is generated in the rotational joint 5, so that the rotational joint 5 rotationally moves around the wheel side installation point $O_1$ of the upper link 6 so as to displace rearward in fore-and-aft direction of the vehicle. However, in this embodiment, the axis Lu of the upper link 6 has a negative inclination angle θ in plan or as viewed from the upper-side, and therefore the rotational joint 5 displaces outward in the width direction of the vehicle when it displaces inward in the fore-and-aft direction. As a result, the camber angle of the outside wheel in the turn is changed into a negative direction under the action of the stabilizer reaction force F. It will be understood that other effects are the same as those of the first embodiment front suspension.

Figure 13:
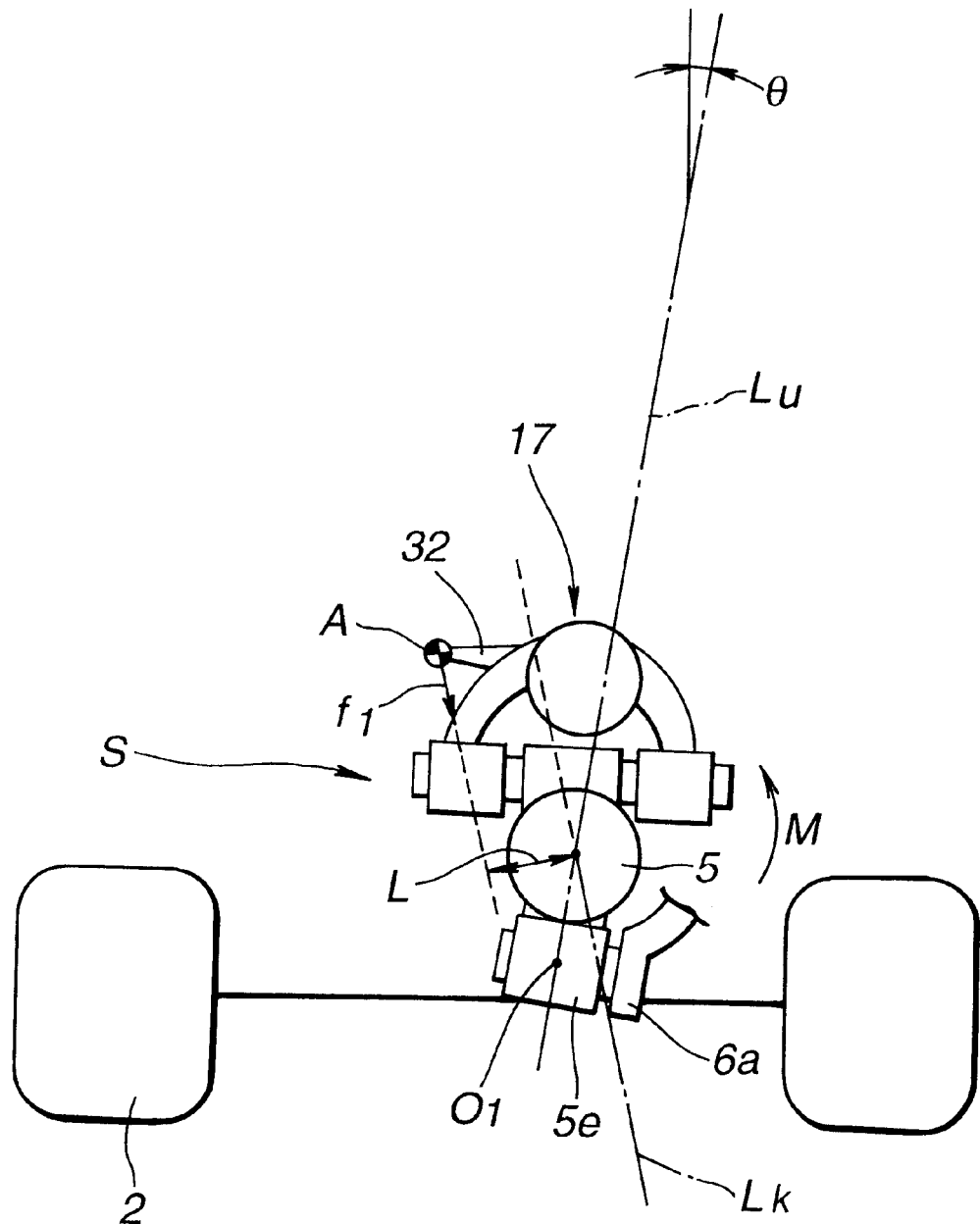
FIG. 13 is a fragmentary schematic plan view similar to FIG. 3 but showing a third embodiment of the front suspension according to the present invention.

FIG. 13 illustrates a third embodiment of the front suspension according to the present invention, which is similar in basic arrangement to the first embodiment front suspension as shown in FIGS. 1 to 10 with the following exception: The king pin axis $L_K$ inclines in such a manner as to be directed outward in the width direction of the vehicle as a point on the king pin axis $L_K$ shifts upward. Additionally, the wheel side installation point of the stabilizer bar 31 is set to be located forward relative the king pin axis LK (the axis of the rotational joint 5) in the fore-and-aft direction, in plan or as viewed from the upper-side. The upper link 6 is disposed rearward of the rotational joint 5 in order to avoid interference with the connecting rod 30. It will be understood that other arrangements of this embodiment are similar to that of the first embodiment and a description of those are thus omitted.

In operation, when the vehicle is in a turn, a downward stabilizer reaction force F is input to the wheel side installation point A of the stabilizer bar 31 at the side of the outside wheel in the turn. At this time, similarly to in the first embodiment, the component force $f_1$ parallel with the king pin axis $L_K$ and the component force $f_2$ perpendicular to the king pin axis $L_K$ in plan are generated at the wheel side installation point A of the stabilizer bar 31. Here, the king pin axis $L_K$ inclines outward in the width direction of the vehicle, and therefore the above component force perpendicular to the king pin axis $L_K$ is directed outward in the width direction of the vehicle. Additionally, since the wheel side installation point A of the stabilizer bar 31 is offset forward relative to the king pin axis $L_K$ in the fore-and-aft direction of the vehicle, the moment M which is the same in turning direction as that in the first embodiment is generated in the rotational joint 5, so that the rotational joint 5 rotationally moves around the wheel side installation point $O_1$ of the upper link 6 so as to displace forward in fore-and-aft direction of the vehicle. By this, similarly to the first embodiment, the rotational joint 5 displaces inward in the width direction of the vehicle when it displaces forward in the fore-and-aft direction. As a result, the camber angle of the outside wheel in the turn is changed into a negative direction under the action of the stabilizer reaction force F. It will be understood that other effects are the same as those of the first embodiment front suspension.

Figure 14:
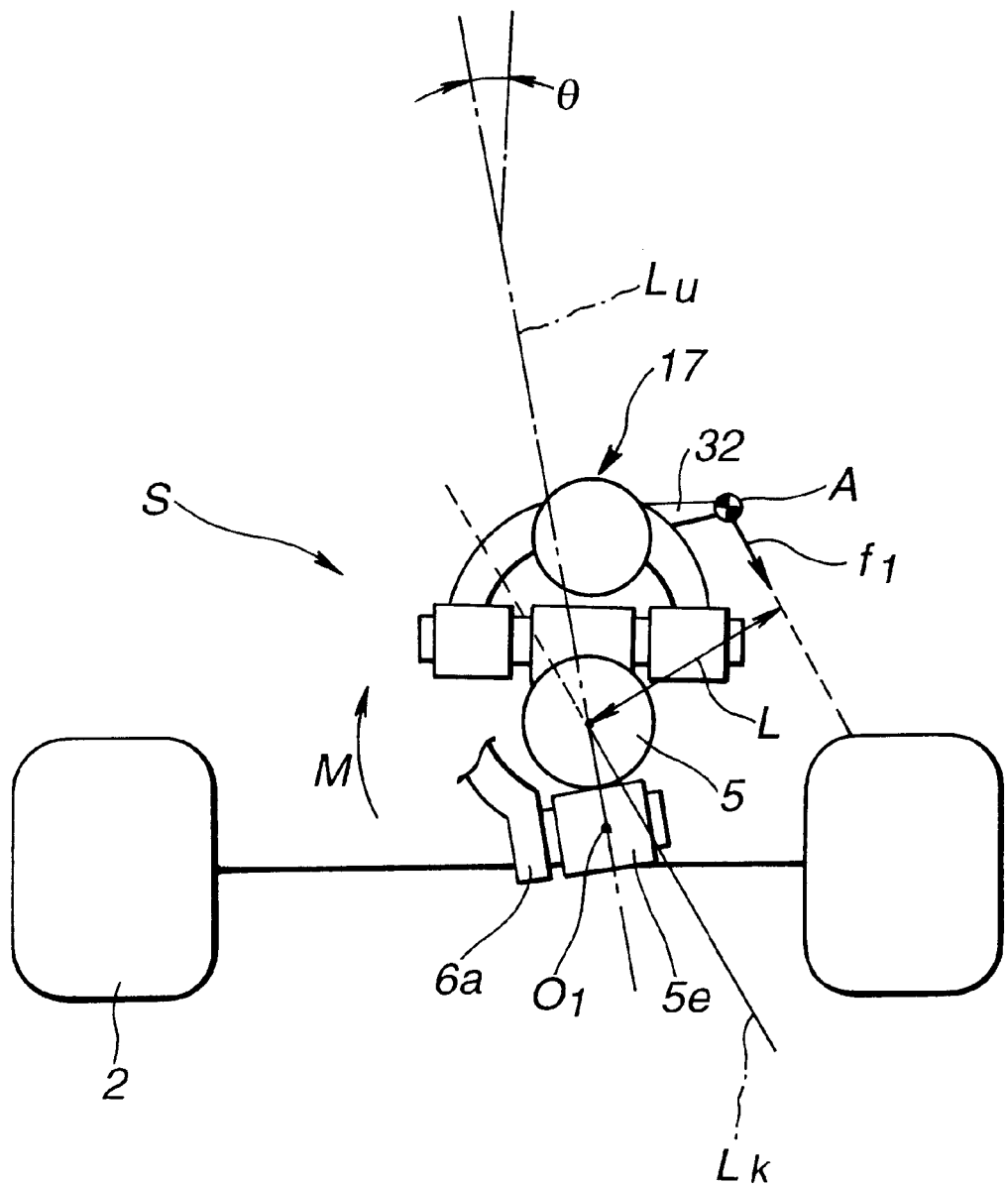
FIG. 14 is a fragmentary schematic plan view similar to FIG. 3 but showing a fourth embodiment of the front suspension according to the present invention.

FIG. 14 illustrates a fourth embodiment of the front suspension according to the present invention, which is similar in basic arrangement to the first embodiment front suspension as shown in FIGS. 1 to 10 with the following exception: The king pin axis $L_K$ is inclined in such a manner as to be directed outward in the width direction of the vehicle as a point on the king pin axis $L_K$ shifts upward. It will be understood that other arrangements of this embodiment are similar to that of the first embodiment and a description of those are thus omitted.

In operation, when the vehicle is in a turn, a downward stabilizer reaction force F is input to the wheel side installation point A of the stabilizer bar 31 at the side of the outside wheel in the turn. At this time, similarly to in the first embodiment, the component force $f_1$ parallel with the king pin axis $L_K$ and the component force $f_2$ perpendicular to the king pin axis $L_K$ in plan is generated at the wheel side installation point A of the stabilizer bar 31. Here, the king pin axis $L_K$ inclines outward in the width direction of the vehicle, and therefore the above component force perpendicular to the king pin axis $L_K$ is directed outward in the width direction of the vehicle. Additionally, since the wheel side installation point A of the stabilizer bar 31 is offset rearward relative to the king pin axis $L_K$ in the fore-and-aft direction of the vehicle, the moment M which is the same in turning direction as that in the second embodiment is generated in the rotational joint 5, so that the rotational joint 5 rotationally moves around the wheel side installation point $O_1$ of the upper link 6 so as to displace rearward in fore-and-aft direction of the vehicle. By this, similarly to the second embodiment, the rotational joint 5 displaces inward in the width direction of the vehicle when it displaces rearward in the fore-and-aft direction. As a result, the camber angle of the outside wheel in the turn is changed into a negative direction under the action of the stabilizer reaction force F. It will be understood that other effects are the same as those of the first embodiment front suspension.

What is claimed is:

1. A front suspension for a vehicle, comprising:
   a wheel supporting member for rotatably supporting a front wheel of the vehicle;
   a lower link having a first end section rotatably connected to a lower section of said wheel supporting member, and a second end section pivotally connected to a vehicle body-side member;
   a joint mechanism disposed at an upper section of said wheel supporting member, said joint mechanism including a joining member which is rotatable around an imaginary axis of said joint mechanism which axis extends generally vertical;
   a shock absorber having an upper end section connected pivotally to the vehicle body-side member, and a lower section connected to said joining member of said joint mechanism;
   an upper link having a first end section connected pivotally to the vehicle body-side member, and a second end section connected pivotally to said joining member of said joint mechanism, said first end section including a single first connecting member forming part of a first connector through which said upper link first end section is connected to the vehicle body-side member, said second end section including a single second connecting member forming part of a second connector through which said upper link second end section is connected to said joining member of said joint mechanism, said first and second connectors having respectively first and second centers, said first and second centers being connected by an imaginary upper link axis which crosses the axis of said joint mechanism on an imaginary horizontal plane containing a longitudinal axis of the vehicle;
   a tie rod which is movable in a width direction of the vehicle with steering so as to rotationally move said wheel supporting member; and
   a stabilizer bar having a wheel-side installation section which is connected through a connecting rod and through said lower section of said shock absorber at an installation position to said joining member of said joint mechanism, said installation position being set such that said joining member is rotatable around said second connector so as to draw an upper side of said wheel supporting member inward in the width direction of the vehicle when a downward force is input from said stabilizer bar to said installation position, said installation position being fixed relative to said joining member and located outside a region between said axis of said joint mechanism and said upper link axis on the imaginary horizontal plane.

2. A front suspension as claimed in claim 1, wherein said joining member includes a cylindrical member which is rotatable around said axis of said joint mechanism, and a support bracket which is pivotally connected to said cylindrical member, the lower section of said shock absorber being connected to said support bracket.

3. A front suspension as claimed in claim 2, wherein said installation position is fixed relative to said support bracket.

4. A front suspension for a vehicle, comprising:
   a wheel supporting member for rotatably supporting a front wheel of the vehicle;
   a lower link having a first end section rotatably connected to a lower section of said wheel supporting member, and a second end section pivotally connected to a vehicle body-side member;
   a joint mechanism disposed at an upper section of said wheel supporting member, said joint mechanism including a joining member which is rotatable around an imaginary axis of said joint mechanism which axis extends generally vertical;

a shock absorber having an upper end section connected pivotally to the vehicle body-side member, and a lower section connected to said joining member of said joint mechanism;

an upper link having a first end section connected pivotally to the vehicle body-side member, and a second end section connected pivotally to said joining member of said joint mechanism, said first end section including a single first connecting member forming part of a first connector through which said upper link first end section is connected to the vehicle body-side member, said second end section including a single second connecting member forming part of a second connector through which said upper link second end section is connected to said joining member of said joint mechanism, said first and second connectors having respectively first and second centers, said first and second centers being connected by an imaginary upper link axis which crosses the axis of said joint mechanism on a first imaginary horizontal plane including a longitudinal axis of the vehicle and on a second imaginary vertical plane to which the longitudinal axis of the vehicle is perpendicular;

a tie rod which is movable in a width direction of the vehicle with steering so as to rotationally move said wheel supporting member; and a stabilizer bar having a wheel-side installation section which is connected through a connecting rod and through said lower section of said shock absorber at an installation position to said joining member of said joint mechanism, said installation position being set such that said joining member is rotatable around said second connector so as to draw an upper side of said wheel supporting member inward in the width direction of the vehicle when a downward force is input from said stabilizer bar to said installation position, said installation position being fixed relative to said joining member and located outside a region between said axis of said joint mechanism and said upper link axis on the imaginary horizontal plane.

5. A front suspension for a vehicle, comprising:

a wheel supporting member for rotatably supporting a front wheel of the vehicle;

a lower link having a first end section rotatably connected to a lower section of said wheel supporting member, and a second end section pivotally connected to a vehicle body-side member;

a joint mechanism disposed at an upper section of said wheel supporting member, said joint mechanism including a joining member which is rotatable around an imaginary axis of said joint mechanism which axis extends generally vertical;

a shock absorber having an upper end section connected pivotally to the vehicle body-side member, and a lower section connected to said joining member of said joint mechanism;

an upper link having a first end section connected pivotally to the vehicle body-side member, and a second end section connected pivotally to said joining member of said joint mechanism, said first end section including a single first connecting member forming part of a first connector through which said upper link first end section is connected to the vehicle body-side member, said second end section including a single second connecting member forming part of a second connector through which said upper link second end section is connected to said joining member of said joint mechanism, said first and second connectors having respectively first and second centers, said first and second centers being connected by an imaginary upper link axis which crosses the axis of said joint mechanism to form a crossing point;

a tie rod which is movable in a width direction of the vehicle with steering so as to rotationally move said wheel supporting member; and a stabilizer bar having a wheel-side installation section which is connected through a connecting rod and through said lower section of said shock absorber at an installation position to said joining member of said joint mechanism, said installation position being set such that said joining member is rotatable around said second connector so as to draw an upper side of said wheel supporting member inward in the width direction of the vehicle when a downward force is input from said stabilizer bar to said installation position;

wherein said axis of said joint mechanism is inclined in a manner to be inward in the width direction of the vehicle as a position on said axis shifts upward; said upper link axis is inclined in a manner to be located forward in the fore-and-aft direction of the vehicle, at an outboard side of the vehicle relative to an inboard side of the vehicle body; and said installation position for said stabilizer bar is located to be rearward relative to said axis of said joint mechanism in the fore-and-aft direction of the vehicle.

6. A front suspension as claimed in claim 5, wherein said joining member includes a cylindrical member which is rotatable around said axis of said joint mechanism, and a support bracket which is pivotally connected to said cylindrical member, the lower section of said shock absorber being connected to said support bracket.

7. A front suspension as claimed in claim 6, wherein the wheel-side installation section of said stabilizer bar is connected to said support bracket.

8. A front suspension as claimed in claim 7, further comprising a bracket member fixed to said support bracket and extending generally in the fore-and-aft direction of the vehicle.

9. A front suspension as claimed in claim 8, further comprising a connecting rod for connecting the wheel-side installation section of said stabilizer bar to said bracket member.

10. A front suspension as claimed in claim 7, wherein said first connecting member of said upper link is rotatably disposed in the vehicle body-side member through a first cylindrical elastomeric bushing disposed between said first connecting member and said vehicle body-side member; and said second connecting member of said upper link is rotatably disposed inside a cylindrical support member fixed to said cylindrical member of said joining member through a second cylindrical elastomeric bushing disposed between said second connecting member and said cylindrical support member.

11. A front suspension as claimed in claim 10, wherein said first cylindrical elastomeric bushing has an axis whose axial center corresponds to said first center of said first connector, and said second cylindrical elastomeric bushing has an axis whose axial center corresponds to said second center of said second connector.

12. A front suspension for a vehicle, comprising:

a wheel supporting member for rotatably supporting a front wheel of the vehicle;

a lower link having a first end section rotatably connected to a lower section of said wheel supporting member, and a second end section pivotally connected to a vehicle body-side member;

a joint mechanism disposed at an upper section of said wheel supporting member, said joint mechanism including a joining member which is rotatable around an imaginary axis of said joint mechanism which axis extends generally vertical;

a shock absorber having an upper end section connected pivotally to the vehicle body-side member, and a lower section connected to said joining member of said joint mechanism;

an upper link having a first end section connected pivotally to the vehicle body-side member, and a second end section connected pivotally to said joining member of said joint mechanism, said first end section including a single first connecting member forming part of a first connector through which said upper link first end section is connected to the vehicle body-side member, said second end section including a single second connecting member forming part of a second connector through which said upper link second end section is connected to said joining member of said joint mechanism, said first and second connectors having respectively first and second centers, said first and second centers being connected by an imaginary upper link axis which crosses the axis of said joint mechanism to form a crossing point;

a tie rod which is movable in a width direction of the vehicle with steering so as to rotationally move said wheel supporting member; and a stabilizer bar having a wheel-side installation section which is connected through a connecting rod and through said lower section of said shock absorber at an installation position to said joining member of said joint mechanism, said installation position being set such that said joining member is rotatable around said second connector so as to draw an upper side of said wheel supporting member inward in the width direction of the vehicle when a downward force is input from said stabilizer bar to said installation position;

wherein said axis of said joint mechanism is inclined in a manner to become inward in the width direction of the vehicle as a position on said axis shifts upward; said upper link axis is included in a manner to be located rearward in the fore-and-aft direction of the vehicle, at an outboard side of the vehicle relative to an inboard side of the vehicle body; and said installation position for said stabilizer bar is located to be forward relative to said axis of said joint mechanism in the fore-and-after direction of the vehicle.

13. A front suspension for a vehicle, comprising:

a wheel supporting member for rotatably supporting a front wheel of the vehicle;

a lower link having a first end section rotatably connected to a lower section of said wheel supporting member, and a second end section pivotally connected to a vehicle body-side member;

a joint mechanism disposed at an upper section of said wheel supporting member, said joint mechanism including a joining member which is rotatable around an imaginary axis of said joint mechanism which axis extends generally vertical;

a shock absorber having an upper end section connected pivotally to the vehicle body-side member, and a lower section connected to said joining member of said joint mechanism;

an upper link having a first end section connected pivotally to the vehicle body-side member, and a second end section connected pivotally to said joining member of said joint mechanism, said first end section including a single first connecting member forming part of a first connector through which said upper link first end section is connected to the vehicle body-side member, said second end section including a single second connecting member forming part of a second connector through which said upper link second end section is connected to said joining member of said joint mechanism, said first and second connectors having respectively first and second centers, said first and second centers being connected by an imaginary upper link axis which crosses the axis of said joint mechanism to form a crossing point;

a tie rod which is movable in a width direction of the vehicle with steering so as to rotationally move said wheel supporting member; and a stabilizer bar having a wheel-side installation section which is connected through a connecting rod and through said lower section of said shock absorber at an installation position to said joining member of said joint mechanism, said installation position being set such that said joining member is rotatable around said second connector so as to draw an upper side of said wheel supporting member inward in the width direction of the vehicle when a downward force is input from said stabilizer-bar to said installation position;

wherein said axis of said joining mechanism is inclined in a manner to become outward in the width direction of the vehicle as a position on said axis shifts upward; said upper link axis is inclined in a manner to be located forward in the fore-and-aft direction of the vehicle, at an outboard side of the vehicle relative to an inboard side of the vehicle body; and said installation position for said stabilizer bar is located to be forward relative to said axis of said joint mechanism in the fore-and-after direction of the vehicle.

14. A front suspension for a vehicle comprising:

a wheel supporting member for rotatably supporting a front wheel of the vehicle;

a lower link having a first end section rotatably connected to a lower section of said wheel supporting member, and a second end section pivotally connected to a vehicle body-side member;

a joint mechanism disposed at an upper section of said wheel supporting member, said joint mechanism including a joining member which is rotatable around an imaginary axis of said joint mechanism which axis extends generally vertical;

a shock absorber having an upper end section connected pivotally to the vehicle body-side member, and a lower section connected to said joining member of said joint mechanism;

an upper link having a first end section connected pivotally to the vehicle body-side member, and second end section connected pivotally to said joining member of said joint mechanism, said first end section including a single first connecting member forming part of a first connector through which said upper link first end section is connected to the vehicle body-side member, said second end section including a single second connecting member forming part of a second connector through which said upper link second end section is connected to said joining member of said joint mechanism, said first and second connectors having respectively first and second centers, said first and second centers being connected by an imaginary upper link axis which crosses the axis of said joint mechanism to form a crossing point;

a tie rod which is movable in a width direction of the vehicle with steering so as to rotationally move said wheel supporting member; and a stabilizer bar having a wheel-side installation section which is connected through a connecting rod and through said lower section of said shock absorber at an installation position to said joining member of said joint mechanism, said installation position being set such that said joining member is rotatable around said second connector so as to draw an upper side of said wheel supporting member inward in the width direction of the vehicle when a downward force is input from said stabilizer bar to said installation position;

wherein said axis of said joint mechanism is inclined in a manner to become outward in the width direction of the vehicle as a position on said axis shifts upward; said upper link axis is inclined in a manner to be located rearward in the fore-and-aft direction of the vehicle, at an outboard side of the vehicle relative to an inboard side of the vehicle body; said installation position for said stabilizer bar is located to be rearward relative to said axis of said joint mechanism in the fore-and-aft direction of the vehicle.

15. A front suspension for a vehicle, comprising:

a wheel supporting member for rotatably supporting a front wheel of the vehicle;

a lower link having a first end section rotatably connected to a lower section of said wheel supporting member, and a second end section pivotally connected to a vehicle body-side member;

a joint mechanism disposed at an upper section of said wheel supporting member, said joint mechanism including a joining member which is rotatable around an imaginary axis of said joint mechanism which axis extends generally vertical;

a shock absorber having an upper end section connected pivotally to the vehicle body-side member, and a lower section connected to said joining member of said joint mechanism;

an upper link having a first end section connected pivotally to the vehicle body-side member, and a second end section connected pivotally to said joining member of said joint mechanism, said first end section including a single first connecting member forming part of a first connector through which said upper link first end section is connected to the vehicle body-side member, said second end section including a single second connecting member forming part of a second connector through which said upper link second end section is connected to said joining member of said joint mechanism, said first and second connectors having respectively first and second centers, said first and second centers being connected by an imaginary upper link axis which crosses the axis of said joint mechanism on an imaginary horizontal plane containing a longitudinal axis of the vehicle;

a tie rod which is movable in a width direction of the vehicle with steering so as to rotationally move said wheel supporting member; and a stabilizer bar having a wheel-side installation section which is connected through a connecting rod and through said lower section of said shock absorber at an installation position to said joining member of said joint mechanism, said installation position being set such that said joining member is rotatable around said second connector so as to draw an upper side of said wheel supporting member inward in the width direction of the vehicle when a downward force is input from said stabilizer bar to said installation position.

* * * * *